Figure 3:
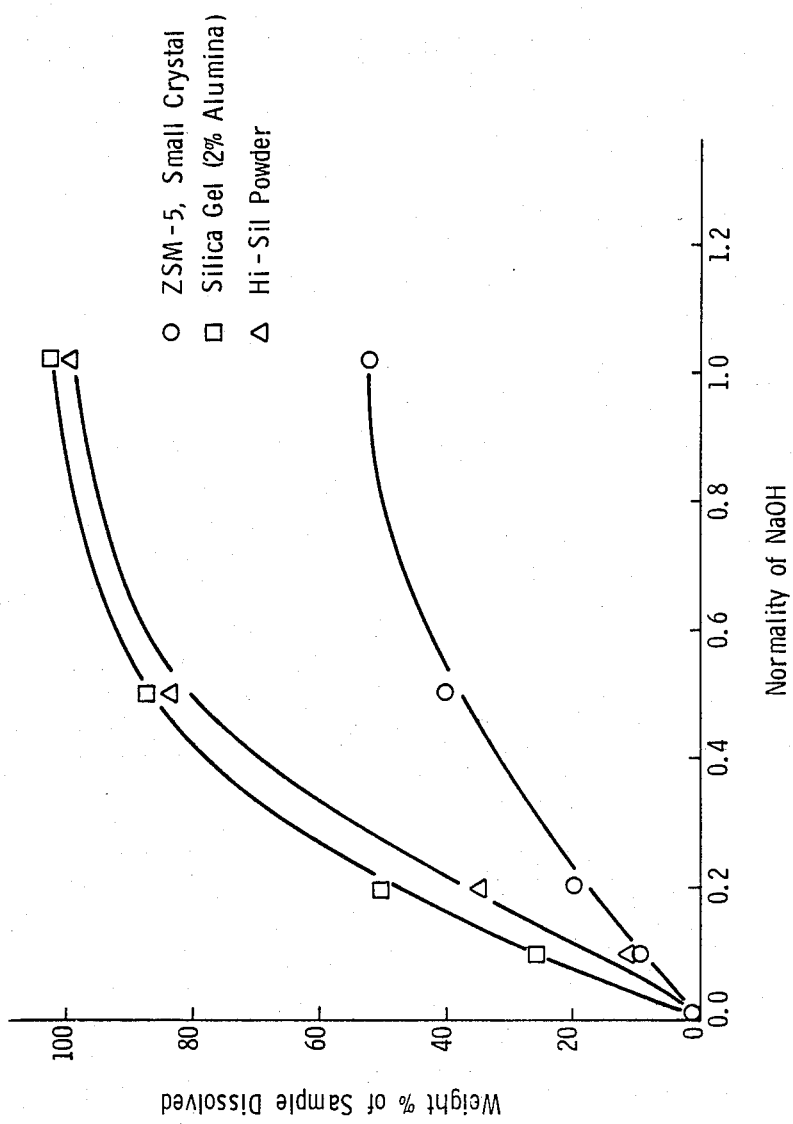

United States Patent [19]

Chu et al.

[11] Patent Number: 4,497,786

[45] Date of Patent: Feb. 5, 1985

[54] DEAGGLOMERATION OF POROUS SILICEOUS CRYSTALLINE MATERIALS

[75] Inventors: Pochen Chu, West Deptford, N.J.; Albin Huss, Jr., Chadds Ford; James C. Vartuli, West Chester, both of Pa.

[73] Assignee: Mobil Oil Corporation, New York, N.Y.

[21] Appl. No.: 517,598

[22] Filed: Jul. 27, 1983

[51] Int. Cl.$^3$ ............................................. C01B 33/28
[52] U.S. Cl. .................................... 423/329; 423/328
[58] Field of Search ............................. 423/326–332; 502/60, 77, 78, 79

[56] References Cited

U.S. PATENT DOCUMENTS

| | | | |
|---|---|---|---|
| 3,236,909 | 2/1966 | Winnick | 502/60 |
| 3,374,182 | 3/1968 | Young | 423/328 |
| 3,702,886 | 11/1972 | Argauer et al. | 423/328 |
| 3,878,129 | 4/1975 | Rosback | 423/328 |
| 4,134,965 | 1/1979 | Rein et al. | 423/328 |
| 4,260,495 | 4/1981 | Bennoit et al. | 423/328 |
| 4,263,129 | 4/1981 | Chen et al. | 208/120 |

FOREIGN PATENT DOCUMENTS 53-58498  5/1978  Japan ....................................... 502/60

*Primary Examiner*—Edward J. Meros
*Attorney, Agent, or Firm*—Alexander J. McKillop; Michael G. Gilman; Van D. Harrison, Jr.

[57] ABSTRACT

Agglomerated crystalline zeolites are deagglomerated by treating the zeolite following crystallization. At a point where crystallization is complete, a basic solution is added and/or the temperature of the reaction mass is increased by between 50° and 100° F. Alternatively, the crystalline zeolite is recovered and thereafter treated with a basic solution.

9 Claims, 7 Drawing Figures

FIG. 1
Caustic Treatment of Low-Sodium ZSM-5
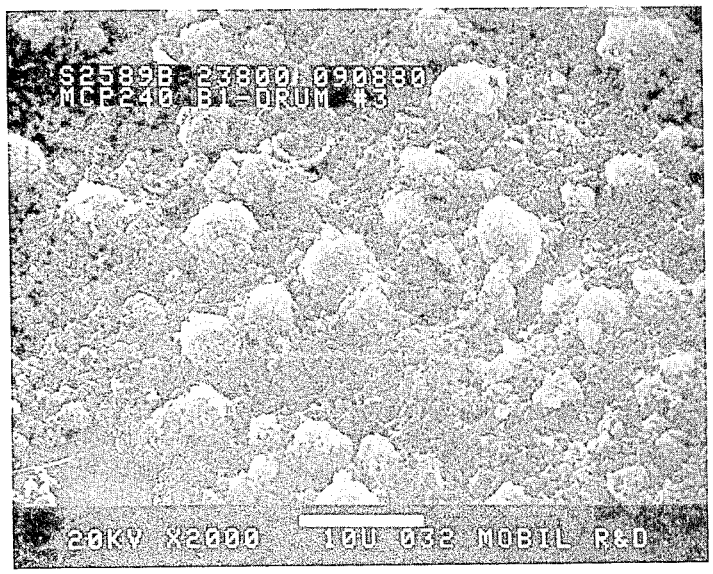
Example 1
Low-Sodium ZSM-5
Untreated
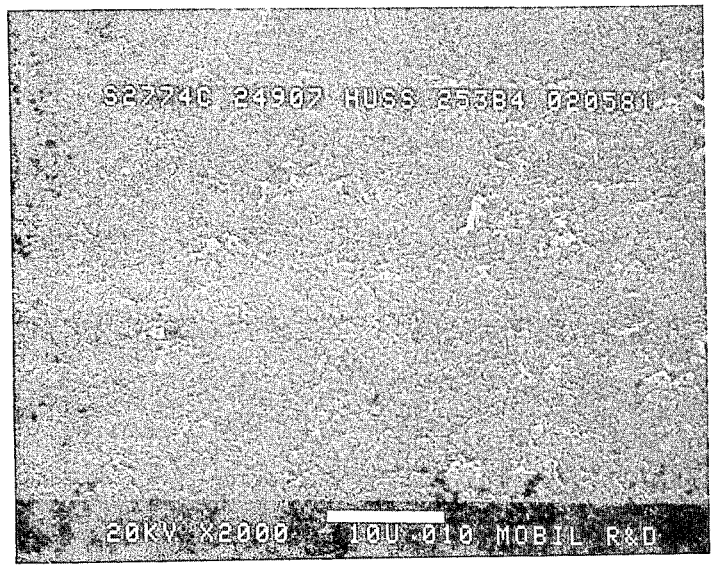
Example 4
Low Sodium ZSM-5
Caustic Treated
pH=11.9 for
18 hrs @ R.T.

FIG. 2
Caustic Treatment of High-Solids Low-Sodium ZSM-5
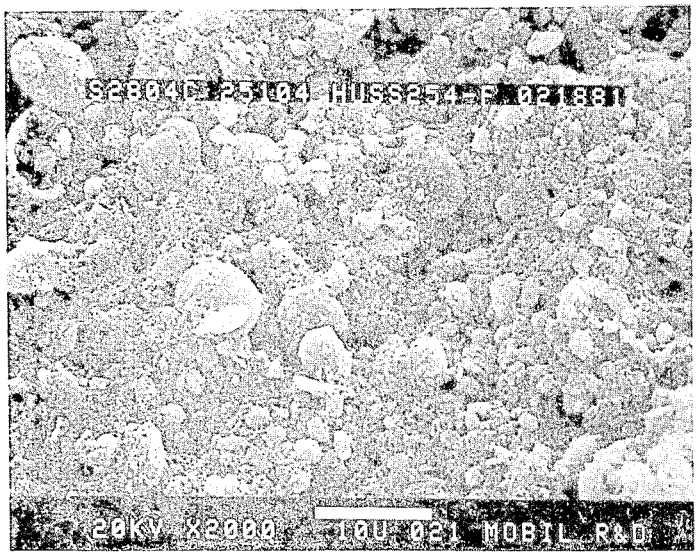
Example 6
High-Solids
Low-Sodium
ZSM-5
Untreated
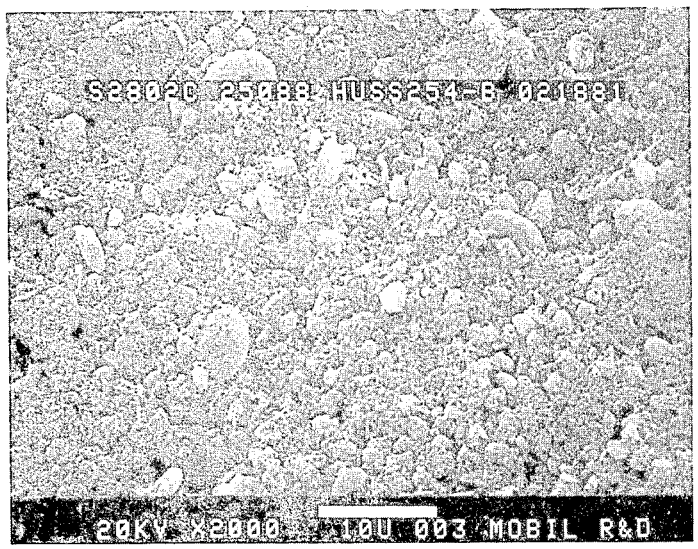
Example 7
High-Solids
Low-Sodium ZSM-5
Caustic Treated
pH=11.97
24 hrs @ R.T.

FIG. 2 (continued)
Example 8
High-Solids
Low-Sodium ZSM-5
Caustic Treated
pH=12.71
24 hrs @ R.T.
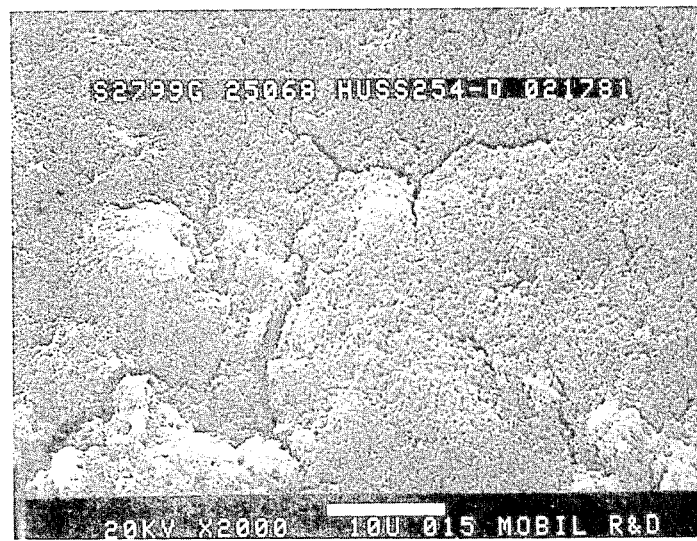
Example 9
High-Solids
Low-Sodium ZSM-5
Caustic Treated
pH=13.3
24 hrs @ R.T.

Concentration Effect: Caustic Treatment

FIG. 5
NaAlO$_2$ Treatment of High-Solids Low-Sodium ZSM-5
Example 13
3N NaAlO$_2$ Treatment
4 hours
pH 12.8
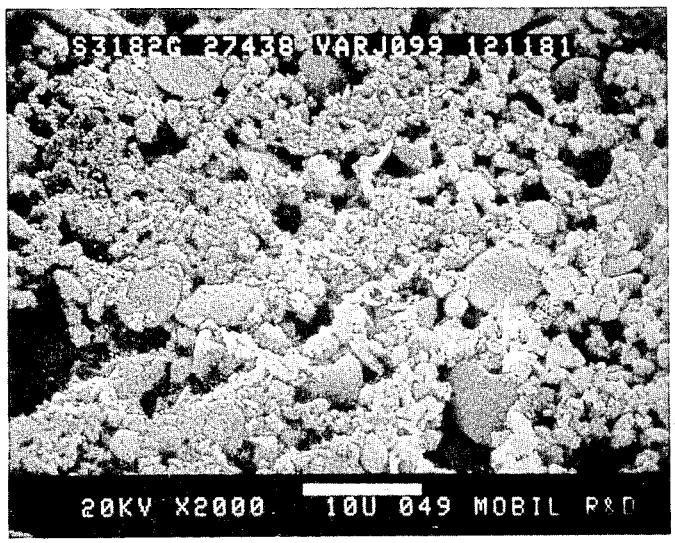
Example 14
3N NaAlO$_2$ Treatment
24 hours
pH 12.8

FIG. 5 (continued)
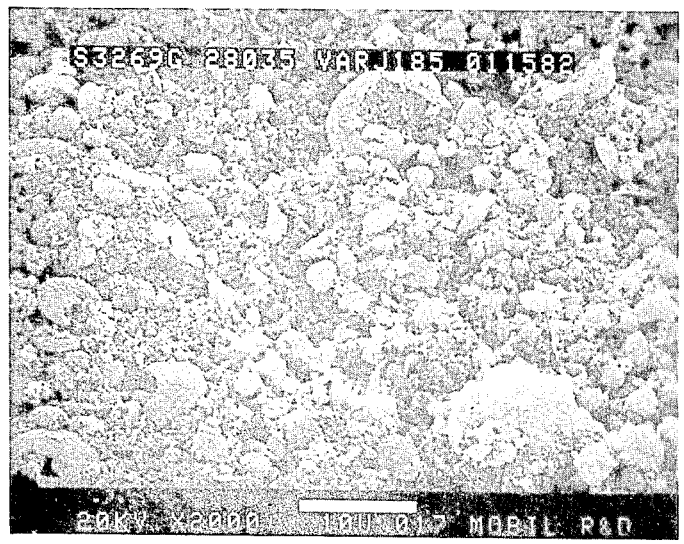
Example 15
0.75N NaAlO$_2$
Treatment
4 hours
pH 11.7
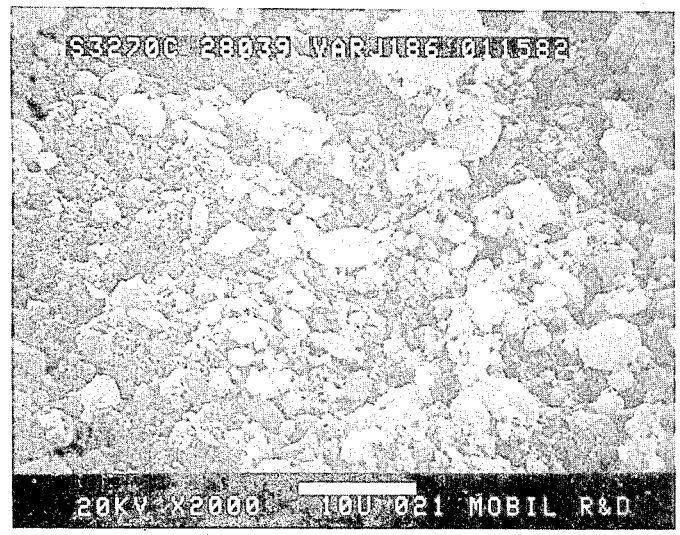
Example 16
0.75N NaAlO$_2$
Treatment
24 hours
pH 11.7

FIG. 6
Physical Treatments of High-Solids Low-Sodium ZSM-5
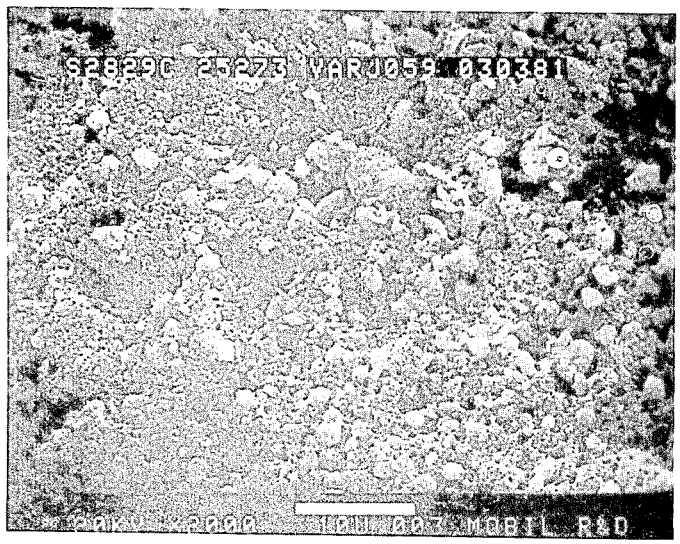
Example 17
High Speed
Cowles Mixing
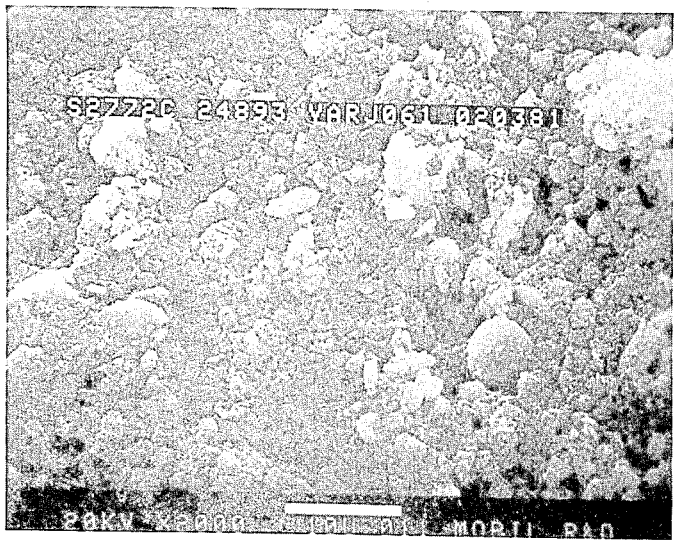
Example 18
Homogenization
Treatment

FIG. 7
Combined Caustic and Physical Treatments of High-Solids Low-Sodium ZSM-5
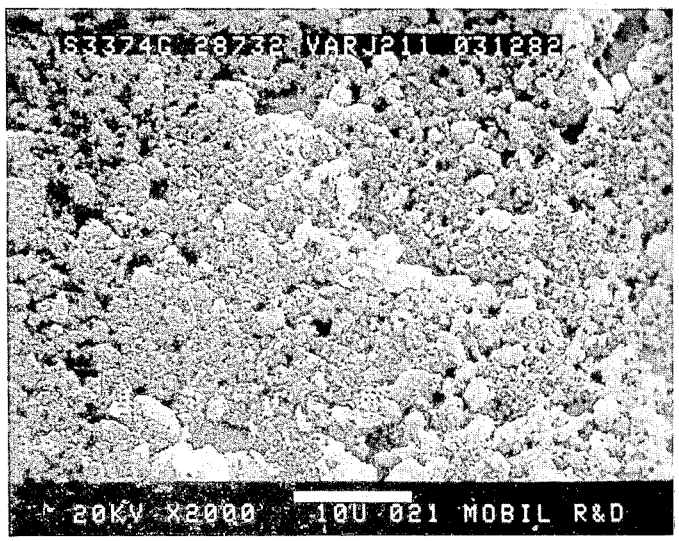
Example 19
2% NaOH Treatment
2 hours
pH 12.7
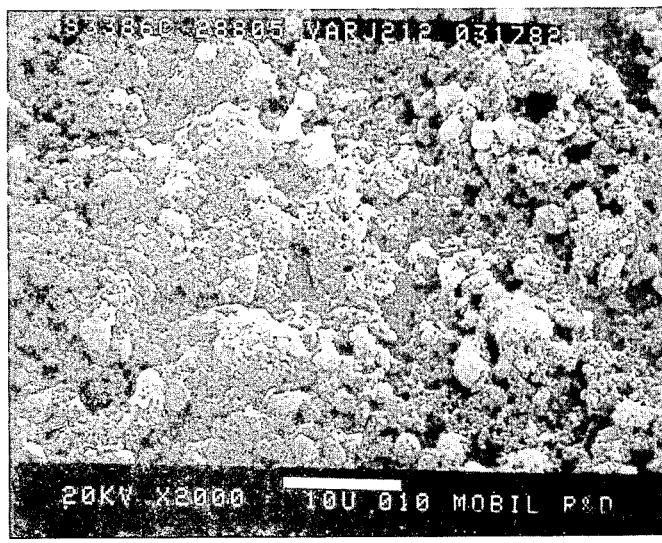
Example 20
Combined 2% NaOH Treatment and High Speed Cowles Mixing
pH 12.9

DEAGGLOMERATION OF POROUS SILICEOUS CRYSTALLINE MATERIALS

NATURE OF INVENTION

This invention relates to the preparation of porous siliceous crystalline materials. More specifically, it relates to a process for preparing crystalline zeolite compositions wherein the degree of agglomeration of the crystals and the dimensions of agglomerates present are substantially reduced.

BACKGROUND OF THE INVENTION

Highly siliceous porous crystalline materials (zeolite), often loosely termed molecular sieves, are well known in the art. They are characterized by their highly ordered crystalline structures and have pores of nearly uniform dimensions. The highly ordered dispersion of alumina (if present) and silica tetrahedra present in the crystals make for a large number of active sites and the uniform pore openings of the zeolites allow for easy ingress of certain molecular structures. Processes for producing zeolites synthetically are now well known in the art. For example, U.S. Pat. Nos. 3,702,886 and 3,941,871 (Re. 29,948) disclose a process for synthesizing ZSM-5 zeolite in which the zeolite material is crystalized from a reaction mixture of selected reactants. U.S. Pat. No. 3,709,979 discloses a related process for preparing ZSM-11 zeolite by crystallization from a reaction mixture. The preparation of ZSM-12 zeolite by crystallization from a reaction mixture is disclosed in U.S. Pat. No. 3,832,449. The preparation of ZSM-23 is disclosed in U.S. Pat. No. 4,076,842. U.S. Pat. No. 4,016,245 discloses the preparation of ZSM-35 zeolite and U.S. Pat. No. 4,046,859 the preparation of ZSM-38. The preparation of ZSM-48 zeolite is disclosed in U.S. Pat. Nos. 4,397,827 and 4,375,573.

The entire contents of U.S. Pat. Nos. 3,702,886; 3,941,871 (Re. 29,948); 3,709,979; 3,832,449; 4,076,842; 4,016,245; 4,046,859; 4,397,827 and 4,375,573 are incorporated herein by reference.

These disclosures in common describe the preparation of zeolites by crystallizing them from a reaction mixture containing sources of an alkali metal oxide, an organic compound, an oxide of aluminum (if added aluminum is desired), an oxide of silicon, and water.

Often in preparing zeolites for use in commercial operations, such as fixed or fluid bed reactors or adsorption systems, the finely divided zeolites can be mixed with a binder material such as clay, alumina, silica-alumina, etc. and formed into porous pellets or fluid particles. In order to achieve maximum dispersion and effectiveness of the zeolite, it is desirable that the zeolite crystallites be as fine as possible and more importantly that they not be agglomerated into relatively larger size particles. Nonagglomerated or deagglomerated crystals are more easily dispersed in the compositing medium and a greater amount of crystallite surface is exposed for catalytic activity if deagglomerated crystals are used.

A primary object of this invention therefore is to prepare porous siliceous crystalline zeolite materials characterized by a minimum amount of agglomeration of the individual crystallites.

SUMMARY OF THE INVENTION

Briefly stated, this invention constitutes a process for preparing porous siliceous crystalline zeolites wherein sources of an alkali metal oxide, an oxide of aluminum (if desired), an oxide of silicon, an organic cation and water are combined, a siliceous crystalline material is crystalized therefrom, and there is added to the crystallizing mixture, or subsequently thereafter, a basic solution such as alkali metal hydroxide, ammonium hydroxide, or a basic organic compound sufficient to maintain the pH between 9.0 and 13.5, and preferably between 11.5 and 13. The crystalline zeolite is then separated from the crystallizing mixture. Alternatively, the crystalline siliceous material formed from the reaction mixture is removed, and subsequently contacted with the basic solution of alkali metal hydroxide, ammonium hydroxide or an organic base to effect deagglomeration of the crystallite particles.

DESCRIPTION OF THE INVENTION

The porous siliceous crystalline materials are synthesized by preparing a solution containing sources of an alkali metal oxide, preferably sodium oxide, sources of an organic cation, an oxide of aluminum (if the incorporation of aluminum into the zeolite is desired), an oxide of silicon and water. The exact temperature and conditions and ratio of reactants for the particularly desired zeolite is well known to those skilled in the art and is not of itself regarded as a novel part of the process of this invention.

In preparing certain zeolites, however, particularly those of the ZSM-5 type, it is not always desirable to include a source of an oxide of aluminum. The preparation of these high silica zeolites is described, for example, in U.S. Pat. No. 3,941,871, (Re. 29,948, Mar. 27, 1979), which is incorporated herein by reference.

At a point where crystallization is complete, a basic solution (preferably sodium hydroxide) is added and/or the temperature of the reaction mass is increased by between 50° and 100° F. While maintaining the reaction mixture at this elevated pH or this elevated temperature which ordinarily will be greater than 150° F., the crystalline zeolite is separated from the mother liquor for example by filtration. The crystalline zeolite recovered is then further treated by washing with water, ion exchange, drying, calcining, etc.

Alternatively, the crystallization procedure is allowed to go to completion and the crystalline zeolite is recovered as by filtering. The recovered zeolite crystalline mass is then reslurried and treated with the basic solution at an elevated temperature up to about 100° C., more preferably from room temperature to 65° C.

For example, a crystalline zeolite such as ZSM-5 can be suitably synthesized by preparing a solution containing $(R_4N)_2O$, sodium oxide, an oxide of a metal other than a metal of Group IIIA and water and having a composition in terms of mole ratios of oxides falling within the following ranges:

TABLE II

|  | Broad | Preferred |
| --- | --- | --- |
| $OH^-/SiO_2$ | .01–5 | .05–1.0 |
| $R_4N^+/(R_4N^+ + Na^+)$ | .05–1.0 | .1–.8 |
| $H_2O/OH^-$ | 50–1000 | 50–500 |
| $SiO_2/M_{2/n}O$ | $\geq 1$ | $\geq 3$ | wherein R is an alkyl radical, preferably between 2 and 5 carbon atoms and M is total metal. Thereafter, the mixture is maintained until crystals of the zeolite are formed. Preferably, crystallization is performed under pressure in an autoclave or static bomb reactor. The temperature ranges from 100° C. to 200° C. generally, but at lower temperatures, e.g. about 100° C., crystallization time is longer. Typical reaction conditions consist of heating the foregoing reaction mixture to a temperature from about 100° C. to 175° C. for a period of time of from about 6 hours to 60 days. The more preferred temperature range is from about 100° C. to 175° C. with the amount of time at a temperature in such range being from about 12 hours to 30 days.

The treatment of the amorphous mixture is carried out until crystals form.

The desired ZSM-5 can be prepared utilizing materials which supply the appropriate oxide. Such compositions include sodium silicate, colloidal silica, silica hydrosol, silica gel, silicic acid, sodium hydroxide, compounds of the desired metal, other than a metal of Group IIIA and tetraalkylammonium compounds, e.g. tetrapropylammonium bromide. In addition to tetrapropylammonium compounds, it is contemplated that tetramethyl, tetraethyl or tetrabutyl ammonium compounds may similarly be employed. It will be understood that each oxide component utilized in the reaction mixture for preparing the crystalline zeolite of this invention can be supplied by one or more initial reactants and they can be mixed together in any order. For example, sodium oxide can be supplied by an aqueous solution of sodium hydroxide or by an a aqueous solution of sodium silicate; tetrapropylammonium can be supplied in the form of its hydroxide as can the other tetralkylammonium radicals noted hereinabove. The reaction mixture can be prepared either batchwise or continuously. Crystal size and crystallization time of the crystalline composition will vary with the nature of the reaction mixture employed.

The crystalline materials thus described are substantially free of alumina, but may contain very minor amounts of such oxide attributable primarily to the presence of aluminum impurities in the reactants and/or equipment employed. Thus, the molar ratio of alumina to silica will be in the range of 0 to less than 0.005 $Al_2O_3$ to more than 1 mole of $SiO_2$. Generally, the latter may range from 1 $SiO_2$ up to 500 or more.

In a similar manner, other crystalline zeolite materials are prepared particularly those having a constraint index of between 1 and 12 and a silica to alumina ratio greater than 12, more particularly the zeolites ZSM-11, ZSM-12, ZSM-21, ZSM-23, ZSM-35, and ZSM-38.

Although it is preferred to use aqueous solutions of sodium hydroxide as the washing medium or to add to the crystallizing reaction mixture, the hydroxides of other alkali metals such as potassium, lithium or mixtures thereof can be used. Ammonium hydroxide as well as aqueous solutions of basic organic compounds such as amines can also be used.

In the following examples, Examples 1-5 cover the synthesis of and caustic (NaOH) treatment of Low-Sodium ZSM-5 synthesis by the Hydrogel Procedure. Examples 6-10 examine the synthesis of and caustic (NaOH) treatment of High-Solids Low Sodium ZSM-5. In both cases the effect of the caustic treatment on the chemical composition and degree of crystal agglomeration is examined. Examples 11 and 12 compare the relative stability of ZSM-5 and amorphous silica gel as a function of caustic concentration, time and temperature. Examples 13-16 show treatment with basic materials other than sodium hydroxide. Examples 17 and 18 deal with the use of physical methods for reducing ZSM-5 agglomeratic while Examples 19 and 20 examine combined chemical and physical treatments.

EXAMPLE 1

Synthesis of Low-Sodium ZSM-5

A sodium silicate solution was prepared by mixing 16 parts water and 27.7 parts sodium silicate (28.7 wt. % $SiO_2$, 8.9 wt. % $Na_2O$, 62.4 wt. % $H_2O$) followed by addition of 0.08 parts Daxad 27 (W. R. Grace Chemical Division). The solution was cooled to approximately 15° C.

An acid solution was prepared by adding 1 part aluminum sulfate (17.2 wt. % $Al_2O_3$) to 16.4 parts water followed by 2.4 parts sulfuric acid (93 wt. % $H_2SO_4$) and 1.2 parts NaCl.

These solutions were mixed in an agitated vessel while 3.9 parts of NaCl were added. The molar matios expressed as oxides were as follows in the resultant mixture:

$SiO_2/AL_2O_3 = 78.5$ $Na_2O/AL_2O_3 = 49.5$

The gel was then heated to about 93° C., agitation was reduced and an organic solution containing 0.8 parts n-propyl bromide and 1.5 parts methyl ethyl ketone was added above the gel. After these organics were added, 2.3 parts of n-propyl amine was added to the organic phase above the gel. This mixture was held at about 93° C. for 6 hours, then severe agitation was resumed. Crystallization was conducted at 93°-99° C. until the gel was 80% crystallized, at which time temperature was increased to 150°-160° C. Unreacted organics were removed by flashing and the remaining contents cooled. The zeolite slurry product was diluted with 4-5 parts water per part slurry and 0.0002 parts of flocculent (Rohm and Haas, Primafloc C-7) per part slurry, and allowed to settle. Supernant liquid was drawn off. The settled solids were reslurried to the original volume of the preceeding step with water and 0.00005 parts of flocculent per part slurry. After settling, the aqueous phase was decanted. This was repeated until the sodium level of the zeolite was less than 0.10 wt. %. Then 0.1 parts ammonium nitrate per part slurry were added to the settled solids and the water from the previous decantation. The mixture was reslurried and the solids were allowed to settle. The washed zeolite solids were filtered identified as ZSM-5 by X-ray diffraction, and analyzed as having a $SiO_2/Al_2O_3$ mole ratio of 62.6 and a sodium content of 0.02 wt. % (dry basis).

The detailed chemical analysee are listed in Table 1 along with the results following mild caustic treatment (Examples 2-5).

EXAMPLES 2-5

To the filtered wetcake from Example 1 was added 1 part deionized water and 2.1 parts of a 0.42 wt. % NaOH solution per part of filtered wetcake. The treatment was carried out at room temperature for 0, 4, 18 and 90 hours for Examples 2-5, respectively. The details of the caustic treatment along with chemical analysis of the treated zeolite and filtrate are shown in Table 1. The filtrates from these caustic treatments (Examples 2-5) each contained 5-25 times the silicon content (330-1600 ppm Si) as the filtrate from a $H_2O$ washed zeolite (64 ppm Si), indicating dissolution of some amorphous and/or crystalline $SiO_2$. The effect of the caustic treatment on crystal agglomeration is illustrated in FIG. 1, a comparison of scanning electron micrographs of the low sodium ZSM-5 before (Example 1) and after (Example 4) an 18 hr. caustic treatment at an initial pH of 11.9.

The size and degree of crystal agglomeration was significantly reduced. Note that the low-sodium ZSM-5 of Examples 1–5 was synthesized by the standard hydrogel technique. The zeolite synthesized in Example 6 which was used in Examples 7–10 was prepared using solid silica as the $SiO_2$ source.

EXAMPLE 6

An aluminate solution was prepared by dissolving 11 parts of aluminum sulfate, 15.6 parts of sodium hydroxide and 1 part of ZSM-5 seed (100% solid basis) in 268 parts of water. One hundred and ten parts of Hi-Sil (an amorphous precipitated silica manufactured by PPG Industries) was then gradually added to the solution followed by 5 parts of sodium chloride crystal and 13.3 parts n-propylamine. The mixture was agitated for at least 4 hours to obtain a homogeneous slurry. The mixture was then heated to 215° F. for approximately 50 hours under constant agitation. The filtered, water-washed and dried solid product had an X-ray crystallinity of 75% based on a specific standard. The detailed chemical analyses are listed in Table 2 along with the results following caustic treatment (Examples 7–9).

EXAMPLE 7

To the filtered wetcake of Example 6 was added 1 part deionized water and 4.20 parts of a 0.42 wt. % NaOH solution per part of filtered wetcake. The treatment was carried out at room temperature for 24 hours. The caustic treated zeolite was then filtered and both the filtrate and the remaining zeolite were analyzed. The details of the caustic treatment and the chemical analysis results are given in Table 2 along with the results from the caustic treatments of Examples 8 and 9.

EXAMPLE 8

Procedure was identical to Example 7 except that a 2 wt. % NaOH solution was used for the caustic treatment.

EXAMPLES 9 AND 10

The procedure of Example 9 was identical to Example 7 except that a 10 wt. % NaOH solution was used for the caustic treatment. Example 10 is a blank comparison run using deionized water only. The effect of the caustic treatments on crystal agglomeration is clearly illustrated in FIG. 2, a comparison of scanning electron micrographs of the high-solids low-sodium ZSM-5 before (Example 6) and after a 24 hour caustic treatment at initial pH's of 11.97, 12.71 and 13.30 (Examples 7–9). As the treatment pH increases the degree of agglomeration is reduced significantly. In comparison with the low-sodium ZSM-5 synthesized by the hydrogel procedure (Example 1, FIG. 1) the micrographs indicate that to reduce crystal agglomeration to a comparable level a higher pH is required for the high-solids low-sodium ZSM-5 (Example 6, FIG. 2). The chemical analyses data of Table 2 indicate increasing Si and Al in the filtrate as the caustic treatment pH is increased. In addition, the $SiO_2/Al_2O_3$ ratio corresponding to the filtrate Si and Al content is 99.3, 123.5 and 55.3 for pH's of 11.97, 12.71 and 13.3 (Examples 7–9), respectively. In comparison, the untreated ZSM-5 has a $SiO_2/Al_2O_3$ ratio of 53.5. These filtrate chemical analyses indicate that at pH 11.97 and 12.71 the material which is dissolved is highly silicious—possibly amorphous $SiO_2$, while at pH 13.3 the lower filtrate $SiO_2/Al_2O_3$ ratio suggests dissolution of a portion of the zeolite as well. This result is also supported by the reduction in the zeolite $SiO_2/Al_2O_3$ ratio following the caustic treatments and the apparent reduced X-ray crystallinity of the sample treated at pH 13.3.

EXAMPLE 11

To demonstrate ZSM-5 crystal is more stable than amorphous silicious material, the following experiment was carried out. The ZSM-5 crystals of 0.02–0.05µ size range were prepared by the method described in Example 1. The amorphous silica-alumina gel was prepared by the same method except no heat was applied. Four grams each of the above three samples (based on 100% solids) were treated with 100 ml of $H_2O$, 0.1N, 0.2N, 0.5N and 1.0N of NaOH solution respectively at 100° C. for a period of 1 hour. The remaining solid after the treatment was separated from the solution using a centrifuge. The weight of washed and dried samples were plotted against the concentration of the caustic solutions in FIG. 3. The solubility of amorphous silica gel and Hi-Sil is much greater than crystalline ZSM-5.

EXAMPLE 12

Figure 4:
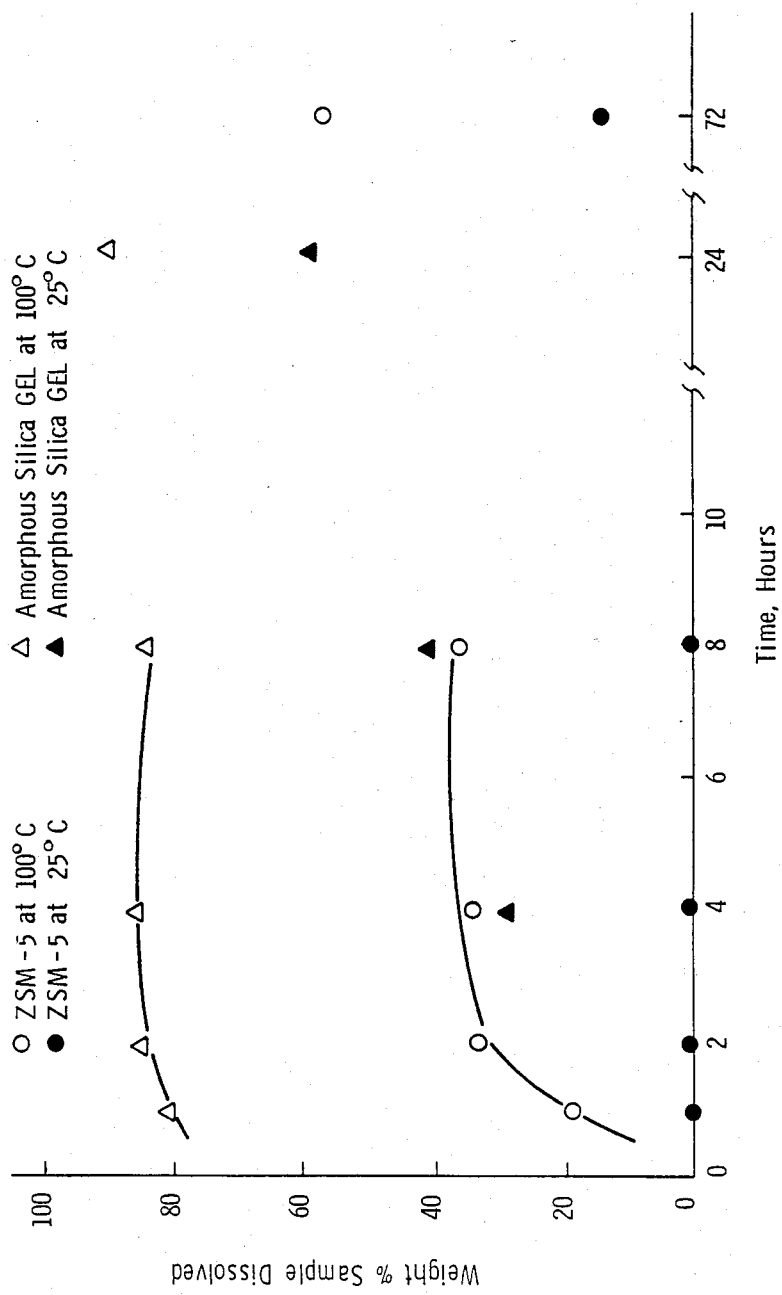

The ZSM-5 crystal and silica amorphous gel described in Example 11 were treated in four gram samples with 100 ml of 0.5N NaOH at 25° C. and 100° C. for 1 hour, 2 hours, 4 hours, 8 hours, 24 hours and 72 hours. The undissolved solid was separated from caustic solution by centrifuge after treatment. The result is plotted in FIG. 4. Amorphous silica gel was more soluble at both temperatures. The weight of undissolved solid stabilized after about 2 hours.

TABLE 1

Effect of Caustic Treatment on the Chemical Composition of Low Sodium ZSM-5

| | Example Number | | | | |
|---|---|---|---|---|---|
| | 1 | 2 | 3 | 4 | 5 |
| Treatment Conditions: | | | | | |
| Wt. of Reagents, gm | | | | | |
| Zeolite Wetcake | — | 200 | 200 | 200 | 200 |
| Deionized $H_2O$ | — | 200 | 200 | 200 | 200 |
| NaOH Soln (0.42 wt %) | — | 420 | 420 | 420 | 420 |
| Treatment Temp, °F. | — | R.T. | R.T. | R.T. | R.T. |
| Treatment Time, hrs. | — | 0 | 4 | 18 | 90 |
| Filtrate Analysis | | | | | |
| pH | — | 11.88 | 11.0 | 10.87 | 9.89 |
| Al, ppm | — | — | 34 | 20 | 33 |
| Si, ppm | — | — | 685 | 1600 | 330 |
| Na, ppm | — | — | 880 | — | 1100 |
| Low-Sodium ZSM-5 Analysis | | | | | |
| Wt. %: $SiO_2$ | 81.2 | — | 87.6 | 84.0 | 88.8 |
| $Al_2O_3$ | 2.20 | — | 2.3 | 2.2 | 2.8 |
| C | 4.77 | — | 5.56 | 6.17 | 5.83 |
| N | 1.36 | — | 1.23 | 1.50 | 1.36 |
| Na | 0.02 | — | <0.09 | <0.09 | <.05 |
| Ash | 86.4 | — | 91.3 | 89.2 | 91.1 |
| Mole Ratios | | | | | |
| $SiO_2$ | 62.6 | — | 64.6 | 64.8 | 53.8 |
| $Al_2O_3$ | 1 | — | 1 | 1 | 1 |
| C | 18.4 | — | 20.54 | 23.8 | 17.7 |
| N | 4.50 | — | 3.89 | 4.97 | 3.54 |
| Na | 0.04 | — | <.17 | <.17 | <.08 |

TABLE 1-continued

Effect of Caustic Treatment on the Chemical Composition of Low Sodium ZSM-5

| | Example Number | | | | |
|---|---|---|---|---|---|
| | 1 | 2 | 3 | 4 | 5 |
| C/N | 4.09 | — | 5.28 | 4.79 | 5.0 |

TABLE 2

Effect of Caustic Treatment on the Chemical Composition of High-Solids Low-Sodium ZSM-5

| | Example Number | | | | |
|---|---|---|---|---|---|
| | 6 | 7 | 8 | 9 | 10 |
| Treatment Conditions: | | | | | |
| Wt. of Reagents, gms | | | | | |
| Zeolite Wetcake(1) | — | 50 | 50 | 50 | 50 |
| Deionized H$_2$O | — | 50 | 50 | 50 | 260 |
| NaOH Soln | — | 210 | 210 | 210 | — |
| | | (0.42 wt. %) | (2 wt. %) | (10 wt. %) | |
| Treatment Temp, °F. | — | R.T. | R.T. | R.T. | R.T. |
| Treatment Time, hrs. | — | 24 | 24 | 24 | 24 |
| Initial Slurry pH | — | 11.97 | 12.71 | 13.30 | 8.87 |
| Filtrate Analysis | | | | | |
| pH | — | 10.87 | 12.34 | 13.13 | 8.46 |
| Al, ppm | — | 31 | 53 | 390 | <1 |
| Si, ppm | — | 1600 | 3400 | 11200 | 80 |
| Na, ppm | — | 0.13 | 0.58 | 2.74 | 0.026 |
| Low-Sodium ZSM-5 Analysis | | | | | |
| Wt. %: SiO$_2$ | 85.2 | 86.4 | 85.2 | 84.0 | 86.4 |
| Al$_2$O$_3$ | 2.7 | 2.9 | 3.1 | 3.0 | 2.8 |
| C | 5.30 | 5.47 | 5.40 | 5.37 | 5.31 |
| N | 1.97 | 1.83 | 1.89 | — | 1.96 |
| Na | 0.39 | <.05 | 0.15 | 2.20 | <0.05 |
| Ash | 90.5 | 90.5 | 90.4 | 88.1 | 90.5 |
| Mole Ratios | | | | | |
| SiO$_2$ | 53.5 | 50.6 | 46.6 | 47.5 | 52.4 |
| Al$_2$O$_3$ | 1 | 1 | 1 | 1 | 1 |
| C | 16.7 | 16.0 | 14.8 | 15.2 | 16.1 |
| N | 5.31 | 4.60 | 4.44 | — | 5.10 |
| Na | 0.64 | <0.08 | 0.21 | 3.25 | <.08 |
| C/N | 3.15 | 3.48 | 3.33 | — | 3.16 |
| X-ray Crystallinity (2) | 75 | 75 | 80 | 65 | 75 |

(1) 36 weight % solids
(2) Based on a specific standard

EXAMPLE 13-16

Treating ZSM-5 with Basic Materials Other Than Sodium Hydroxide

ZSM-5 (synthesized as in Example 6) was treated with sodium aluminate solutions of varied concentrations similar to the caustic treatments described previously. The pH of these solutions were similar to the forementioned caustic solutions. Table 3 lists the conditions and results of these treatments. Within the pH range used in the sodium hydroxide experiments, the sodium aluminate solutions do not appear to be effective in reducing agglomeration. As noted in the silica to alumina ratio of the filtered product, much of the alumina remains with the zeolite after treatment. Furthermore the level of crystallinity decreased with increasing both time and/or severity of treatment. FIG. 5 (Examples 13-16) supports the conclusions that no reduction in zeolite agglomeration took place in the sodium aluminate treatments.

TABLE 3

| Example Number | Weight % Zeolite in Solution | Normality of NaAlO$_2$ | Total Mixing Time | pH Before Treatment | pH After Treatment | % Crystallinity | Silica to alumina Ratio |
|---|---|---|---|---|---|---|---|
| 6 | | | | | | 75 | 53.5 |
| 13 | 11 | 3 | 4 | 12.8 | 13.6 | 50 | 5 |
| 14 | 11 | 3 | 24 | 12.8 | 13.4 | 35 | 4 |
| 15 | 11 | 0.75 | 4 | 11.7 | 12.1 | 65 | 13 |
| 16 | 11 | 0.75 | 24 | 11.7 | 12.1 | 65 | 13 |

EXAMPLES 17 AND 18

ZSM-5 wetcake (refer to Example 6) was added to water to a solids content of approximately 19%. This mixture was stired until homogeneous and then subjected to a four hour high speed mixing on a Cowles Dissolver Model W-24 at 1600 rpm. Example 17 (FIG. 6) shows that the high speed mixing did not reduce the extent of zeolite agglomeration somewhat but not to the extent of the previously described sodium hydroxide treatments.

An equivalent zeolite mixture was prepared and processed through a Gaulin Homogenizer at 1000 psig twice and the filtered. Example 18 (FIG. 6) shows that this type of physical treatment did little to reduce the zeolite agglomeration.

EXAMPLES 19 AND 20

ZSM-5 wetcake (refer to Example 6) was added to water to a solids content of approximately 22%. To this mixture enough (2% wt.) sodium hydroxide was added to reduce the solids content to 11%. The pH of this solution was 12.7. This solution was mixed for 2 hours before a sample was taken, filtered and dried. Example 19 (FIG. 7) shows that as claimed previously the mild caustic treatment did reduce the zeolite agglomeration. To the remaining solution additional 2% (wt.) sodium hydroxide was added to reduce the solids content to 5.5%. The pH of this solution was 12.9. This solution was subjected to two hours of high speed mixing by a Cowles Dissolver Model W-24 at 1600 rpm before a sample was taken, filtered and dried. Example 20 (FIG. 7) illustrates that there was little improvement resulting from the high speed mixing compared to the caustic treatment (Example 19). These results indicate that any improvement in reducing zeolite agglomeration caused by physical treatments is insignificant compared to the chemical treatments.

What is claimed is:

1. In a method for preparing a porous crystalline zeolite wherein a mixture containing sources of an alkali metal oxide, an oxide of silicon, an organic cation and water in predetermined ratios is maintained at a predetermined temperature until said zeolite is crystallized and said zeolite is subsequently separated from said mixture, the improvement comprising after crystallization is complete increasing the temperature of said mixture by an increase of between about 50° and about 100° F. for a period of time sufficient to effect deagglomeration of said zeolite prior to separating said crystallized zeolite from said mixture.

2. The method of claim 1 wherein said mixture also contains a source of aluminum oxide.

3. The method of claim 1 wherein said zeolite is ZSM-5.

4. The method of claim 1 wherein said zeolite is ZSM-11.

5. The method of claim 1 wherein said zeolite is ZSM-12.

6. The method of claim 1 wherein said zeolite is ZSM-23.

7. The method of claim 1 wherein said zeolite is ZSM-35.

8. The method of claim 1 wherein said zeolite is ZSM-38.

9. The method of claim 1 wherein the mixture is maintained at the temperature increase of about 50° to about 100° F. for a time period of about 6 hours to about 60 days.

* * * * *

UNITED STATES PATENT AND TRADEMARK OFFICE
CERTIFICATE OF CORRECTION

PATENT NO. : 4,497,786

DATED : February 5, 1985

INVENTOR(S) : Pochen Chu et al

It is certified that error appears in the above-identified patent and that said Letters Patent is hereby corrected as shown below:

Column 2, line 62, "$\geqq 1$" should be -- $\geq 1$ --.
"$\geq 3$" should be -- $\geq 3$ --.

Column 3, line 27, delete "a".

Column 7, Table 2, line 10, after "Soln" add --(0.42 wt %)--.

Columns 7 & 8, Table 3, Under "Table 3" insert:

--$NaAlO_2$ Treatment of High-Solids Low-Sodium ZSM-5--.

Signed and Sealed this

Sixth Day of August 1985

[SEAL]

Attest:

DONALD J. QUIGG

Attesting Officer     Acting Commissioner of Patents and Trademarks